United States Patent
Stein et al.

(10) Patent No.: US 12,225,854 B2
(45) Date of Patent: Feb. 18, 2025

(54) LEAF RAKE WITH OFFSET TINES AT DIFFERENT END ANGLES AND A SHRUB RAKE

(71) Applicant: The Ames Companies, Inc., Camp Hill, PA (US)

(72) Inventors: Robert James Stein, Mechanicsburg, PA (US); Aaron Daniel Abbott, Harrisburg, PA (US); Jeffrey Joseph Fegley, Hershey, PA (US); Gregory J. Blaszczak, Hummelstown, PA (US)

(73) Assignee: The Ames Companies, Inc., Camp Hill, PA (US)

( * ) Notice: Subject to any disclaimer, the term of this patent is extended or adjusted under 35 U.S.C. 154(b) by 842 days.

(21) Appl. No.: 17/352,985

(22) Filed: Jun. 21, 2021

(65) Prior Publication Data

US 2021/0386013 A1 Dec. 16, 2021

Related U.S. Application Data

(60) Division of application No. 15/857,929, filed on Dec. 29, 2017, now Pat. No. 11,076,526, which is a
(Continued)

(51) Int. Cl.
*A01D 7/06* (2006.01)
*A01B 1/20* (2006.01)
(Continued)

(52) U.S. Cl.
CPC ............. *A01D 7/06* (2013.01); *A01B 1/20* (2013.01); *A01B 1/24* (2013.01); *A01D 7/00* (2013.01);
(Continued)

(58) Field of Classification Search
CPC ... A01D 7/06; A01D 7/00; A01D 7/02; A01D 7/10; A01B 1/20; A01B 1/24; A01G 20/40; A63B 57/50; A63B 60/00
See application file for complete search history.

(56) References Cited

U.S. PATENT DOCUMENTS

| 531,722 | A | | 1/1895 | Hart | |
|---|---|---|---|---|---|
| 962,576 | A | * | 6/1910 | Menzl | A01D 7/10 56/400.08 |

(Continued)

FOREIGN PATENT DOCUMENTS

| CA | 2273320 A1 | 11/2000 |
|---|---|---|
| CA | 2574445 C | 9/2009 |

(Continued)

OTHER PUBLICATIONS

Canadian Office Action for Application No. 3,016,662, dated Jan. 15, 2020, 4 pages.
(Continued)

*Primary Examiner* — Arpad Fabian-Kovacs
(74) *Attorney, Agent, or Firm* — Brooks Kushman P.C.

(57) ABSTRACT

A leaf rake includes a handle having an elongated body with a first end, a medial portion, and a second end, and a head assembly including a base portion and a handle coupling, the handle coupled to the head assembly by the handle coupling. The head assembly includes a first and a second set of tines unitary with the base portion, wherein each tine of the first and second set of tines includes an elongated body having a first end, an offset portion, and a distal second end, wherein the offset portion of the first set of tines is disposed on a first side of the base portion and wherein the offset portion of the second set of tines is disposed on the first side of the base
(Continued)

portion. A shrub rake including a coupling, a base portion and a number of tines is selectively coupled to the head assembly.

13 Claims, 13 Drawing Sheets

Related U.S. Application Data continuation of application No. 14/335,236, filed on Jul. 18, 2014, now Pat. No. 9,854,735.

(60) Provisional application No. 61/856,871, filed on Jul. 22, 2013.

(51) Int. Cl.

| | |
|---|---|
| A01B 1/24 | (2006.01) |
| A01D 7/00 | (2006.01) |
| A01D 7/02 | (2006.01) |
| A01D 7/10 | (2006.01) |
| A01G 20/40 | (2018.01) |
| A63B 57/50 | (2015.01) |
| A63B 60/00 | (2015.01) |

(52) U.S. Cl.
CPC .................. A01D 7/02 (2013.01); A01D 7/10 (2013.01); A01G 20/40 (2018.02); A63B 57/50 (2015.10); A63B 60/00 (2015.10)

(56) References Cited

U.S. PATENT DOCUMENTS

| | | | | |
|---|---|---|---|---|
| 1,230,664 | A * | 6/1917 | Burdett | A01D 7/10 56/400.1 |
| 1,352,386 | A | 9/1920 | Rundberg | |
| 1,577,065 | A | 3/1926 | Fuller | |
| 1,591,738 | A | 7/1926 | Bell | |
| 1,735,237 | A | 11/1929 | Dennis | |
| 2,477,876 | A * | 8/1949 | Jaffa | A47L 13/52 D32/74 |
| 1,925,357 | A | 9/1953 | Withington | |
| 2,707,366 | A | 5/1955 | Gartner | |
| 2,883,820 | A | 4/1959 | Bissell | |
| 3,084,498 | A * | 4/1963 | Straley | A01D 7/00 15/105 |
| 3,332,223 | A | 7/1967 | Polisso | |
| 3,408,803 | A | 11/1968 | Vanderveer | |
| 3,855,766 | A * | 12/1974 | Lutz | A01D 7/04 56/400.18 |
| 3,999,244 | A | 12/1976 | Brickley | |
| 4,037,397 | A | 7/1977 | Fiorentino | |
| 4,150,528 | A | 4/1979 | Rendin | |
| 4,334,583 | A * | 6/1982 | Parker | A01B 1/20 172/380 |
| 4,351,145 | A | 9/1982 | Farkas | |
| 4,545,189 | A | 10/1985 | Nelson | |
| 4,644,740 | A | 2/1987 | Lee | |
| 4,649,698 | A | 3/1987 | Sykora | |
| 4,667,458 | A | 5/1987 | Barrett | |
| 4,741,149 | A * | 5/1988 | vom Braucke | A01G 20/40 294/51 |
| 4,744,208 | A | 5/1988 | King | |
| 4,901,511 | A | 2/1990 | Yarmashev et al. | |
| 5,012,872 | A | 5/1991 | Cohn | |
| 5,099,638 | A | 3/1992 | Bass | |
| 5,161,360 | A | 11/1992 | Hill | |
| 5,177,946 | A | 1/1993 | Dietz, Jr. | |
| 5,241,812 | A | 9/1993 | Crippen | |
| 5,249,413 | A | 10/1993 | McDonough, Jr. | |
| D341,756 | S | 11/1993 | Bass | |
| 5,303,536 | A * | 4/1994 | Tolliver | A01D 7/10 56/400.13 |
| D350,052 | S * | 8/1994 | Sun | D8/13 |
| 5,343,684 | A | 9/1994 | Siler, III | |
| 5,511,370 | A | 4/1996 | Patel | |
| 5,522,209 | A | 6/1996 | Petruzzelli | |
| 5,603,584 | A | 2/1997 | Schuele | |
| 5,713,193 | A | 2/1998 | Stapley et al. | |
| D402,173 | S | 12/1998 | Woodley | |
| D409,460 | S | 5/1999 | Robinson | |
| 5,924,816 | A | 7/1999 | Schuele | |
| 6,032,447 | A * | 3/2000 | Shelton | A01D 7/10 7/114 |
| 6,131,381 | A | 10/2000 | Milbury | |
| 6,370,857 | B1 | 4/2002 | Mitchell | |
| 6,381,938 | B1 | 5/2002 | Kelly | |
| 6,427,431 | B1 | 8/2002 | Hsu | |
| 6,901,733 | B2 | 6/2005 | DeSanti | |
| D509,066 | S * | 9/2005 | Vosbikian | D4/116 |
| 6,983,584 | B1 | 1/2006 | Huang | |
| 7,131,255 | B1 | 11/2006 | Caneba | |
| D597,805 | S * | 8/2009 | Liao | D8/13 |
| D642,440 | S | 8/2011 | Boda et al. | |
| 8,689,533 | B2 * | 4/2014 | Abughazaleh | A01D 7/00 56/400.11 |
| D854,761 | S * | 7/2019 | Filmer | D30/162 |
| D860,550 | S * | 9/2019 | Filmer | D30/162 |
| D982,398 | S * | 4/2023 | Whitehead | D8/13 |
| 2003/0033793 | A1 | 2/2003 | Fairbanks | |
| 2004/0250524 | A1 | 12/2004 | DeSanti | |
| 2007/0119141 | A1 | 5/2007 | Foss | |
| 2007/0125058 | A1 | 6/2007 | Clifton | |
| 2007/0157593 | A1 | 7/2007 | Belanger | |
| 2010/0218476 | A1 | 9/2010 | Gosselin | |
| 2013/0247533 | A1 | 9/2013 | Zupan | |
| 2018/0184582 | A1 | 7/2018 | Orlos | |

FOREIGN PATENT DOCUMENTS

| | | |
|---|---|---|
| CN | 201467734 U | 5/2010 |
| DE | 723566 | 8/1942 |
| DE | 29505599 U1 | 7/1995 |
| EP | 0230004 A1 | 12/1986 |
| EP | 0274732 A1 | 12/1987 |
| GB | 893467 | 4/1962 |

OTHER PUBLICATIONS

Chinese Office Action and English Translation for Application No. 201410539583.5, dated Apr. 9, 2019, 17 pages.
Australian Examination Report for Application No. 2019200067, dated Mar. 13, 2020, 7 pages.
Australian Notice of Acceptance for Application No. 2019200067, dated Jul. 1, 2020, 3 pages.
Rocky Mountain Llamas, No. 1012 The Super Rake, Gifts and Miscellaneous Essentials, https://web.archive.org/web/20101128142348/http://rockymtllamas.com/products/1012.htm, 1 page, May 13, 2014.
Sarah Collins, LexisNexis, The Wall Street Journal, Catalog Critic: Can Rakes Pik Up New Followers, 4 pages, Sep. 27, 2002.
Looking for a Special Lawn Rake Called Super Rake—Tool Shed Forum—Garden Web, http://forums2.gardenweb.com/forums/load/tools/msg0421383222347.html 5, 4 pages, May 14, 2014.
Gardener's Supply Company, http://web.archive.org/web/20020314194725/http://www.gardeners.com/department.aspD . . . , 1 page, May 4, 2014, Burlington, VT.
Gardener's Supply Company, Gardener's Supply: Innovative Gardening Solutions, Composters, Greenhouses, Garden C, http://web.archive.org/web/20020816211542/http://www.gardeners.com/department.asp D . . . , 1 page, May 14, 2014.
Sarah Collins, The Wall Street Journal, Garden Business Turns Rake Into a New Tool, http://online.wsj.com/news/articles/SB103307576570056673, 4 pages, May 14, 2014.
Caryn Eve Murray, The Potting Shed/The Rake's Progress—Newsday, http://www.newsday.com/lifestyle/home-and-garden/the-potting-shed-the-rake-s-progress . . . , 3 pages, May 14, 2014.
Canadian Office Action for Application No. 3,016,662, dated Sep. 9, 2020, 4 pages.

(56) References Cited

OTHER PUBLICATIONS

Canadian Examination Report for Application No. 3,128,319, dated Nov. 10, 2022, 4 pages.
Australian First Examination Report for Application No. 2020227054, dated Nov. 15, 2021, 4 pages.

* cited by examiner

LEAF RAKE WITH OFFSET TINES AT DIFFERENT END ANGLES AND A SHRUB RAKE

CROSS-REFERENCE TO RELATED APPLICATIONS

This application is a division of U.S. application Ser. No. 15/857,929 filed Dec. 29, 2017, which is a continuation of U.S. application Ser. No. 14/335,236 filed Jul. 18, 2014, now U.S. Pat. No. 9,854,735, which, in turn, claims the benefit of U.S. provisional application Ser. No. 61/856,871 filed Jul. 22, 2013, the disclosures of which are hereby incorporated in their entirety by reference herein.

TECHNICAL FIELD

The disclosed and claimed concept relates to a leaf rake and, more specifically, to a leaf rake having two sets of tines with different contours.

BACKGROUND

Leaf rakes are well known in the art. Leaf rakes include a handle and a head assembly. The head assembly includes a handle coupling, a base portion, and a number of tines. The base portion often has a planar triangular shape with the handle coupling disposed at the apex and a number of elongated tines extending from the base. The tines are structured to be flexible. That is, as used herein, a "tine" has an elongated body with a first end, a medial portion, and a second end. As used herein, a tine "medial portion" includes a flexure portion and an offset portion. A tine first end is coupled to, or unitary with, the base portion. A tine body "flexure portion" is structured to allow, and allows, the tine body to flex in, at least, a direction generally normal to the surface being raked. A tine body "offset portion" positions the distal second end out of the plane of the base portion. A tine second end is structured to engage the ground and to drag leaves and other debris.

Accordingly, as used herein, a tine "flexure portion" is that portion of a tine that has a longitudinal axis that is generally in, or generally parallel to, the plane of the base portion. As used herein, a tine "offset portion" is that portion of a tine that has a longitudinal axis that is not in, or generally parallel to, the plane of the base portion. As is known, a tine body may be generally curvilinear or may include a distinct bend. As used herein, and in a tine body that is generally curvilinear, the portion having a longitudinal axis that is within about 45 degrees of the plane of the base portion is the "flexure portion." Conversely, in a tine body that is generally curvilinear the portion having a longitudinal axis that is more than about 45 degrees out of the plane of the base portion is the "offset portion." As used herein, and in a tine body having a sharp bend, or "elbow," the portion between the tine body first end and the bend is the "flexure portion." Conversely, in a tine body having a sharp bend, the portion between the bend and the tine body second end is the "offset portion." Further, as used herein, a tine body "second end" has a length of at least one-half inch. As tines are, generally, thinner than one-half inch, a tine second end has a longitudinal axis that is not generally in, or generally parallel to, the plane of the base portion.

Further, each tine body has a lateral cross-sectional aspect ratio. The lateral cross-sectional aspect ratio is determined relative to the minimal cross-sectional area at any location along the tine. Generally, the minimal cross-sectional area is determined by a plane that passes generally perpendicularly to the local longitudinal axis of the tine; that is, perpendicular to the longitudinal axis of the tine taken at a specific location. Generally, the lateral cross-sectional aspect ratio is determined by comparing a "width" to a perpendicular dimension. As used herein, the perpendicular dimension is identified as "length," but, as detailed below this dimension is not always the dimension parallel to the handle longitudinal axis.

By way of example, a garden rake typically has a number of generally straight tines that extend generally perpendicular to the longitudinal axis of the handle. In this simple configuration, the "width" of a tine is measured in a direction generally perpendicular to the longitudinal axis of the handle and in a plane generally parallel to the plane of the base assembly. Conversely, the "length" of such a straight tine is measured in a direction generally parallel to the longitudinal axis of the handle and in a plane generally parallel to the plane of the base assembly.

The tines on a leaf rake, however, typically have a more complex shape and/or do not extend in a direction that is generally perpendicular to or parallel to the handle longitudinal axis. For example, a typical leaf rake has tines that extend in a generally radial pattern. That is, the outer tines are at a greater angle relative to the handle longitudinal axis than the center tines. Thus, if the tines have an identical cross-section, a plane that is perpendicular to the longitudinal axis of the handle passed through an outer tine would have a greater width than the same plane passed through a center tine. That is, the angle of the outer tine causes the plane that is perpendicular to the longitudinal axis to present a greater "width."

Accordingly, it is understood that, as used herein for the purpose of determining a tine's "lateral cross-sectional aspect ratio," the terms "width" and "length" are measured locally and generally correspond to a lateral "width" and "length" (which as noted above is the direction perpendicular to the width). Thus, to determine the "length" and "width" of a tine for the purpose of measuring an aspect ratio, the "length" and "width" are determined at a specific location along the tine by passing a plane through the tine so as to have a minimal cross-sectional area. The "width" is measured in the direction generally perpendicular to the longitudinal axis of the handle and in a plane generally parallel to the plane of the base assembly. By way of example, in a leaf rake with tines that extend in a generally radial pattern, the "width" of a center tine that is aligned with the longitudinal axis of the handle is the dimension measured in the direction substantially perpendicular to the longitudinal axis of the handle and in a plane generally parallel to the plane of the base assembly. Conversely, the "width" of an outermost tine that is offset from the handle longitudinal axis by about 20 degrees, is the dimension measured in the direction about 20 degrees to the longitudinal axis of the handle and in a plane generally parallel to the plane of the base assembly. It is understood that if the tines have a similar shape and contour, the aspect ratio for the tines is similar and can be easily determined at the centermost tine.

It is noted that the aspect ratio relevant to the disclosed and claimed concept is the aspect ratio of the portion of the tines close to the tips and, as such, the "length," as used herein, is generally parallel to the longitudinal axis of the handle when measured at the tine tips. It is noted that the dimension of a tine perpendicular to the "width" when measured adjacent to the head assembly base portion would more typically be described as a "height" using the convention of length, width and height. But, as noted above, when determining a tine lateral cross-sectional aspect ratio, the dimension perpendicular to the "width" is identified herein as a "length."

Thus, a tine's lateral cross-sectional aspect ratio is the "width" divided by the "length." In a leaf rake, the lateral cross-sectional aspect ratio for the tines is greater than 1.0. Thus, at the distal tips of the tines, the tines are wider in the lateral direction than in the direction generally parallel to the handle longitudinal axis. As another example, a generally circular wire tine has a lateral cross-sectional aspect ratio of about 1.0. That is, a body with a generally circular cross-section is about as wide as it is long. It is noted that some tines (or thatching rake blades, discussed below) may include sharpened points; as used herein, the "lateral cross-sectional aspect ratio" is based on the entire tine, the entire blade or for an identified portion thereof. For example, the "offset portion" lateral cross-sectional aspect ratio is based on the cross-sectional aspect ratio of the entire "offset portion" of a tine and not the aspect ratio at a specific elevation on the offset portion and particularly not at the distal tip.

A leaf rake is structured to remove leaves and debris from the surface of the ground. The ground may include a layer of thatch; a leaf rake is not structured to lift thatch. A leaf rake generally has tines with a lateral cross-sectional aspect ratio that is greater than 1.0. In this configuration, the wide tines are structured to present a wide face to the leaves and debris that are being dragged. That is, tines with a lateral cross-sectional aspect ratio that is greater than 1.0 are wide and therefore have a greater surface area perpendicular to the direction that the tines are moved. Further, the purpose of the leaf rake is to move over the surface being raked. The flexible tines allow this purpose to be accomplished. It is noted that if the tines of a leaf rake were too rigid, then the leaf rake tines would be unsatisfactory for their intended purpose; that is, the tines would bite into the ground.

A garden rake is structured to loosen soil, perform light weeding and to level loose soil. A garden rake may be used to remove thatch as well. The tines of a garden rake are generally shorter than on a leaf rake and typically include only an offset portion extending from a transverse support bar. Further, a garden rake tine has a lateral cross-sectional aspect ratio of about 1.0. That is, a garden rake tine typically has a generally circular or generally square cross-sectional shape. A garden rake tine generally has a cross-sectional area that is larger than a leaf rake. Thus, garden rake tines are short and thick and therefore rigid. Such rigid tines allow the garden rake to bite into the ground or into thatch. It is noted that if a garden rake tine was flexible, or flexibly coupled to the handle, then the tine would be unsatisfactory for its intended purpose; it would not bite into the ground.

A thatching rake is structured to remove thatch. That is, a thatching rake is structured to bite, or dig slightly, into the ground or at least into the layer of thatch that is over the dirt. A thatching rake does not have "tines" as defined herein; rather, a thatching rake includes a number of "blades." As used herein, the "blades" of a thatching rake are planar members disposed in a parallel configuration and have a lateral cross-sectional longitudinal aspect ratio that is generally, or substantially, less than 1.0.

In this configuration, i.e. when the blade's lateral cross-sectional aspect ratio is generally less than 1.0, the thatching rake blade is substantially rigid. This rigidity is required for the thatching rake blades to bite into and lift the thatch. It is noted that if a thatching rake blade was flexible, or flexibly coupled to the handle, then the blade would be unsatisfactory for its intended purpose; it would not bite into and lift the thatch.

A disadvantage of leaf rakes is that the flexible tines allow heavy debris, such as but not limited to wet leaves, to pass under the tines. There is, therefore, a need for a leaf rake that is able to move heavy leaves and debris over the surface of the ground.

Further, leaf rakes are wide, typically over 18 inches at the widest point. Leaf rakes with such a width are difficult to use in locations where trees and shrubs are clustered. To reach such areas, leaf rakes are constructed with a smaller width. The disadvantage to this is that a user must carry two leaf rakes; one for use in open spaces and one or use between shrubs. there is, therefore a need for a rake assembly that is structured to operate on both open and narrow areas.

SUMMARY

These needs, and others, are met by at least one embodiment of this invention which provides for a rake including a first set of tines and a second set of tines. The first set of tines includes a number of tines with an offset portion with a lateral cross-sectional aspect ratio that is greater than 1.0. Tines in the first set of tines, i.e. the wide tines, are structured to engage and move leaves and debris in a traditional manner. The second set of tines includes a number of tines with an offset portion with a lateral cross-sectional aspect ratio that is less than 1.0. Tines in the second set of tines, i.e. the narrow tines, are more rigid and are structured to engage and move heavy leaves and debris.

Accordingly, the disclosed and claimed concept provides for a head assembly for a rake, the head assembly including a base portion, a handle coupling, and a number of tines. Each tine includes an elongated body. Each tine body includes a first end, a flexure portion, an offset portion, and a distal second end. The tines include a first set of tines and a second set of tines. A number of tine bodies in the first set of tines have an offset portion lateral cross-sectional aspect ratio that is greater than 1.0. A number of tine bodies in the second set of tines have an offset portion lateral cross-sectional aspect ratio that is less than 1.0.

Further, the disclosed and claimed concept provides for a leaf rake that includes a selectively coupled shrub rake. That is, the shrub rake is structured to be temporarily coupled to the leaf rake.

BRIEF DESCRIPTION OF THE DRAWINGS

A full understanding of the invention can be gained from the following description of the preferred embodiments when read in conjunction with the accompanying drawings in which.

DETAILED DESCRIPTION

Figure 1:
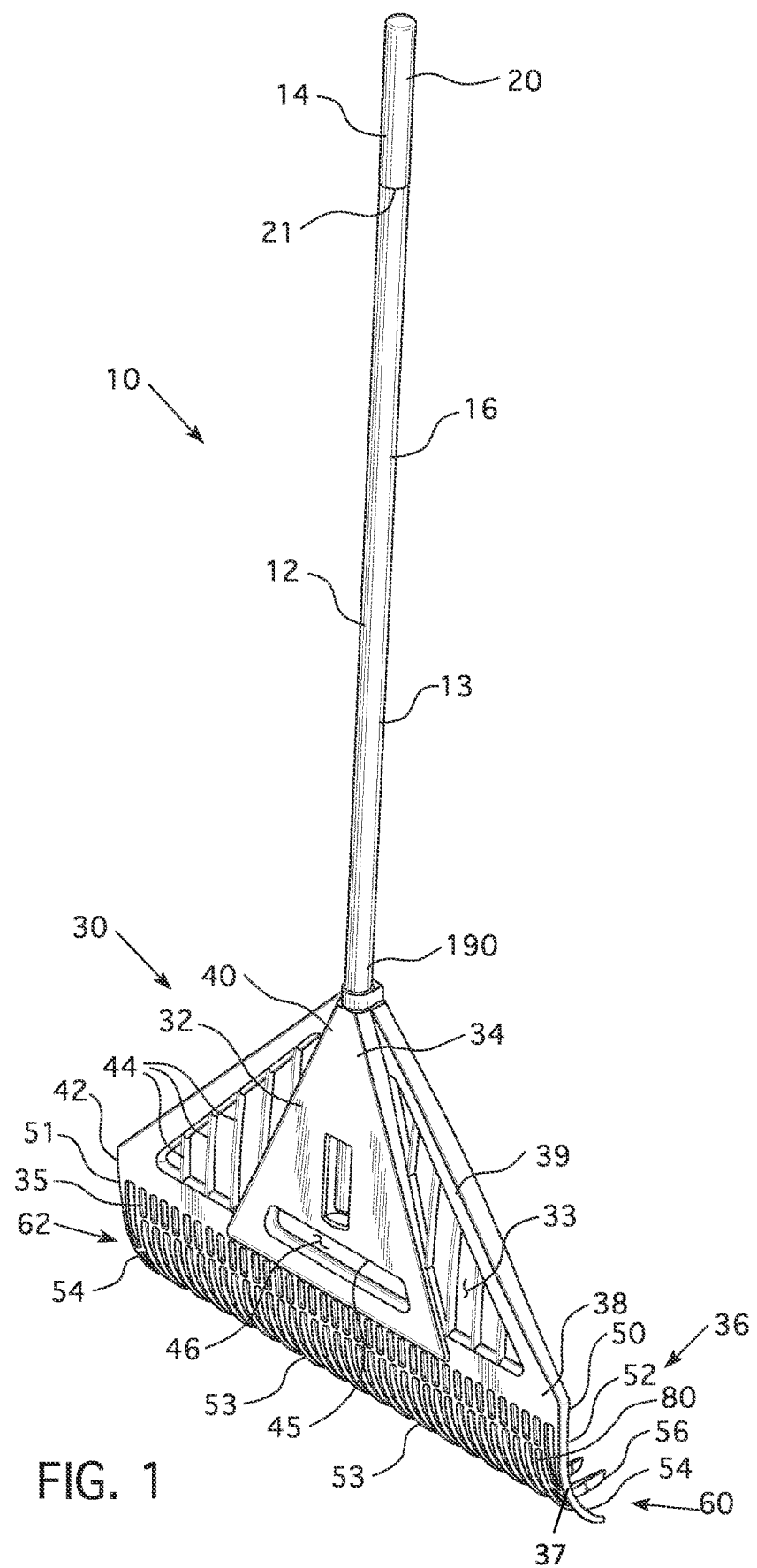
FIG. 1 is an isometric view of a rake.
Figure 2:
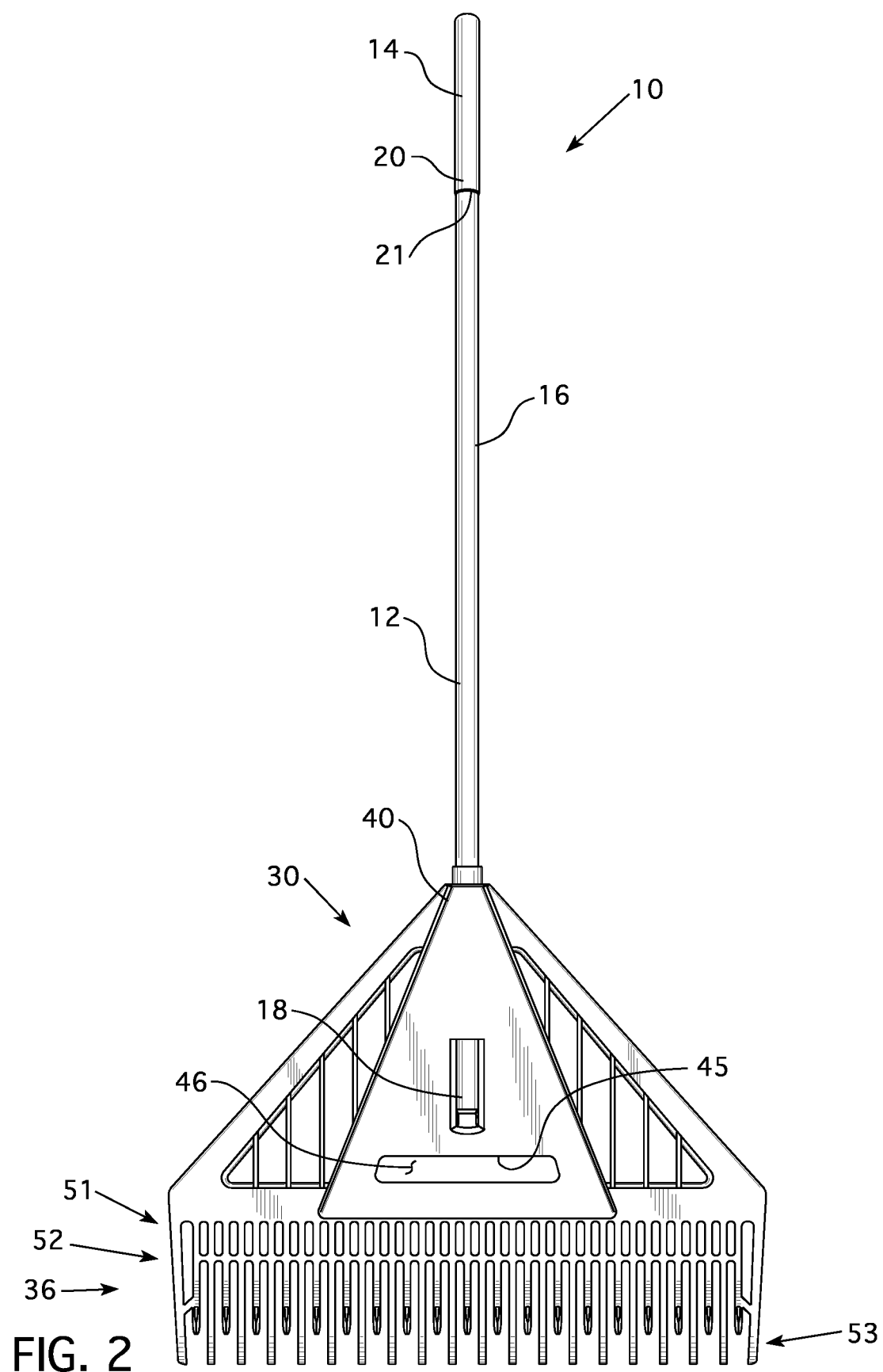
FIG. 2 is a front view of a rake.
Figure 3:
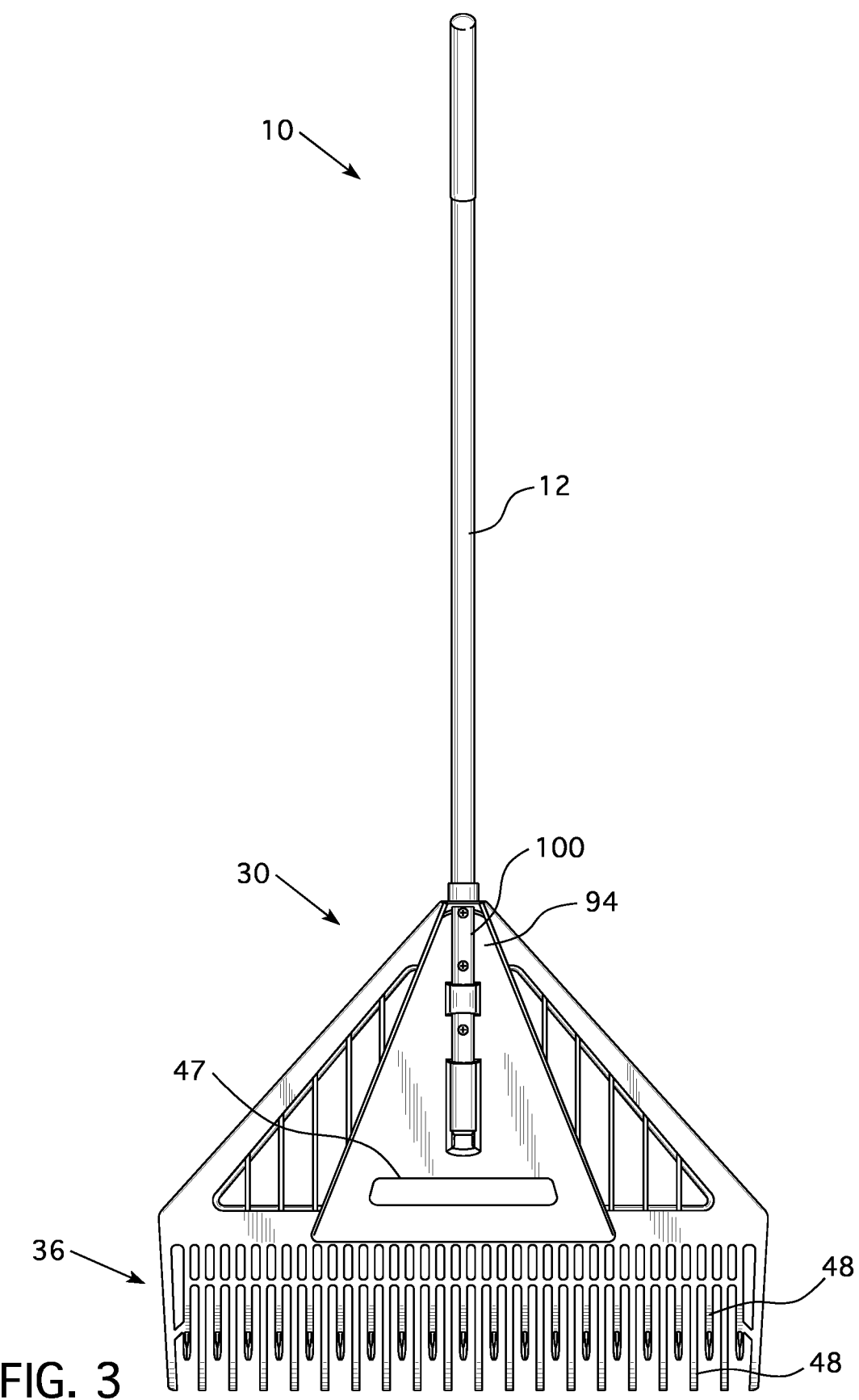
FIG. 3 is a back view of a rake.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein. Generally, a rake base assembly has a front side, which is a broad side that generally faces the sky when in use, a back side, which is a broad side that generally faces the ground when in use, a top side, from which a handle extends, a bottom side opposite the top side, as well as right and left lateral sides.

As used herein, the singular form of "a," "an," and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof.

As used herein, the statement that two or more parts or components "engage" one another shall mean that the elements exert a force or bias against one another either directly or through one or more intermediate elements or components.

As used herein, the word "unitary" means a component is created as a single piece or unit. That is, a component that includes pieces that are created separately and then coupled together as a unit is not a "unitary" component or body.

As used herein, the term "number" shall mean one or an integer greater than one (i.e., a plurality).

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, "correspond," when used in conjunction with a description of an element's shape or size, indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are said to fit "snugly" together or "snuggly correspond." In that situation, the difference between the size of the components is even smaller whereby the amount of friction increases. If the element defining the opening and/or the component inserted into the opening are made from a deformable or compressible material, the opening may even be slightly smaller than the component being inserted into the opening. This definition is further modified if the two components are said to "substantially correspond." "Substantially correspond" means that the size of the opening is very close to the size of the element inserted therein; that is, not so close as to cause substantial friction, as with a snug fit, but with more contact and friction than a "corresponding fit," i.e., a "slightly larger" fit. In reference to contours, perimeters and similar constructs, "correspond" means the constructs have similar contours, perimeters, shapes, and/or characteristics.

As used herein, a "planar body" or "planar member" is a generally thin element including opposed, wide, generally flat surfaces as well as a thinner edge surface extending between the wide flat surfaces. The edge surface may include generally flat portions, e.g. as on a rectangular planar member, or be curved, as on a disk, or have any other shape.

As used herein, a "U-shaped" element, or an element with a "U-shaped cross-section," includes a cross-sectional shape with two tines, which correspond to the vertical elements of the "U" and a "bight" which corresponds to the generally horizontal element of the "U." That is, as used herein, it is inherent that a "U-shaped" element includes a bight and two tines.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies.

Unless noted otherwise, as used herein, the "longitudinal axis" means the longitudinal axis of the handle. It is understood that, in use, a rake is pulled generally along a path aligned, or parallel to, the longitudinal axis.

As used herein, "lateral" means generally perpendicular to the longitudinal axis and generally in the plane of the head assembly.

As used herein, a "handle" is an element that is structured to be grasped by a human hand. Thus, a "handle" is sized, shaped, and positioned, to be grasped by a human hand. An element that is merely capable of being grasped by a human hand but which is not sized, shaped, and positioned, to be grasped by a human hand is not a "handle." For example, a wheelbarrow may include a frame assembly made from tubular members; some tubular members are disposed below the tray while others extend from the back of the tray. Those tubular members extending from the back of the tray are sized, shaped, and positioned, to be grasped by a human hand and are "handles." The similar tubular members under the tray are not sized, shaped, and positioned, to be grasped by a human hand and are not "handles."

As used herein, "grip" is a portion of a handle that includes elements such as a non-slip surface, a resilient cushion, and/or a surface that allows for an alternate grasp on the handle, e.g. a D-grip disposed at the end of an elongated handle.

As used herein, a "snap-fit coupling" means a coupling that is, typically, temporary and wherein two coupling components, one of which is at least minimally flexible, are maintained in a coupled configuration due to a bias created by the minimally flexible component. For example, a passage in a minimally flexible, tubular body, wherein the passage has a longitudinal opening, may be temporarily widened allowing an object to pass into the passage. When the object is in the passage, the minimally flexible body returns the passage to the original configuration with the object disposed in the passage. As is known, the minimally flexible body typically closes about the object with a "snap" or "click" sound.

As used herein, "snap-fit," used as a verb, means to be coupled by a "snap-fit coupling."

As shown in FIGS. 1-11, a leaf rake 10 includes an elongated handle 12 and a head assembly 30. The handle 12 includes a body 13 with an upper, first end 14, a medial portion 16, and a lower, second end 18. The handle 12 is made from a material such as, but not limited to, steel or aluminum tubing, fiberglass tubing, plastic or wood. The handle first end 14 includes a grip 20. The grip 20, in an exemplary embodiment, is made from a resilient and/or slip resistant material such as, but not limited to rubber, foam rubber, textured paint, and/or an elastomer. The grip 20 has a greater cross-sectional area than the handle 12 and, as such, defines a flange 21 at the bottom end of the grip 20. The grip flange 21 extends in the plane that is generally perpendicular to the longitudinal axis of the handle 12. As described below, the handle second end 18 is that portion of the handle that is disposed in the head assembly handle coupling 34. The handle medial portion 16 is the portion of the handle between the handle first end 14 and the handle second end 18.

The head assembly 30 includes a base portion 32, a handle coupling 34, and a number of tines 36. The base portion 32 and the tines 36 are, in an exemplary embodiment, a unitary body 38. The base portion 32 and tines 36 are, in an exemplary embodiment, made from an injection polymer such as, but not limited to, high density polyethylene or propylene. The base portion 32 is a generally planar body 39 having a triangular shape including an apex 40 and a laterally elongated forward edge 42. The base portion 32 includes a number of longitudinal ribs 44. That is, the base portion 32 defines an opening 33 through which the longitudinal ribs 44 extend. Further, as discussed below, the base portion 32 defines a lateral slot 46 disposed adjacent to the tines 36. The base portion lateral slot 46 has a width that is slightly wider, that is at least 0.2 inches wider, than the maximum width of the shrub rake tines 206 which, as noted below, is between about 7.5 inches and 8.0 inches, or about 7.7 inches. The base portion lateral slot 46 includes a displacement surface 45 and a latching surface 47. The lateral slot displacement surface 45 extends about and defines the lateral slot 46. The lateral slot latching surface 47 is disposed on the back side of the base portion body 39 and about the lateral slot 46. Further, the base portion 32, in an exemplary embodiment, includes a number of longitudinal openings 35. In an exemplary embodiment, there is one longitudinal opening 35 aligned with the gap between adjacent tines 36.

Each tine 36 is an elongated body 37 and includes a proximal, first end 50, a medial portion 52 and a distal, second end 54. Each tine body medial portion 52 includes a flexure portion 51 and an offset portion 53. Each tine body second end 54 includes a tip 56. In an exemplary embodiment, a tine 36 includes a support rib 48 on the back (or lower) side. In an alternative embodiment, tine 36 has a self-supporting cross-sectional shape, such as but not limited to an arcuate cross-section.

The number of tines 36 includes a first set of tines 60 ("first set 60") and a second set of tines 62 ("second set 62"). The first set 60 includes a number of tines 36 with a substantially similar shape and contour. Similarly, the second set 62 includes a number of tines 36 with a substantially similar shape and contour. In an exemplary embodiment, a number, a majority, or each tine(s) 36 in each of the first and second sets 60, 62 have a substantially similar shape and contour. In another exemplary embodiment, a majority of tines 36 in each of the first and second sets 60, 62 have a substantially similar shape and contour. In another exemplary embodiment, all tines 36 in each of the first and second sets 60, 62 have a substantially similar shape and contour. For example, as shown in FIG. 1, the majority of tines 36 in the first set 60 have a substantially similar shape and contour. That is, the two outermost tines have a slightly different shape for aesthetic reasons, as discussed below.

Figure 4:
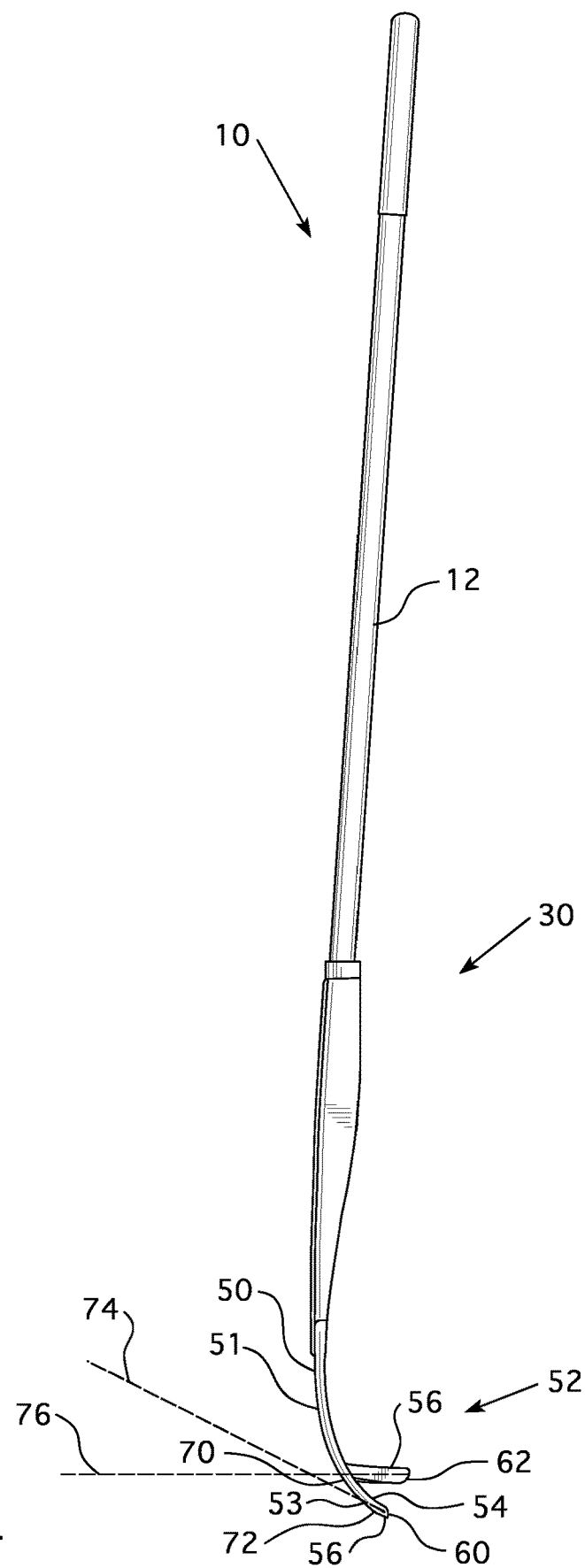
FIG. 4 is a left side view of a rake.
Figure 5:
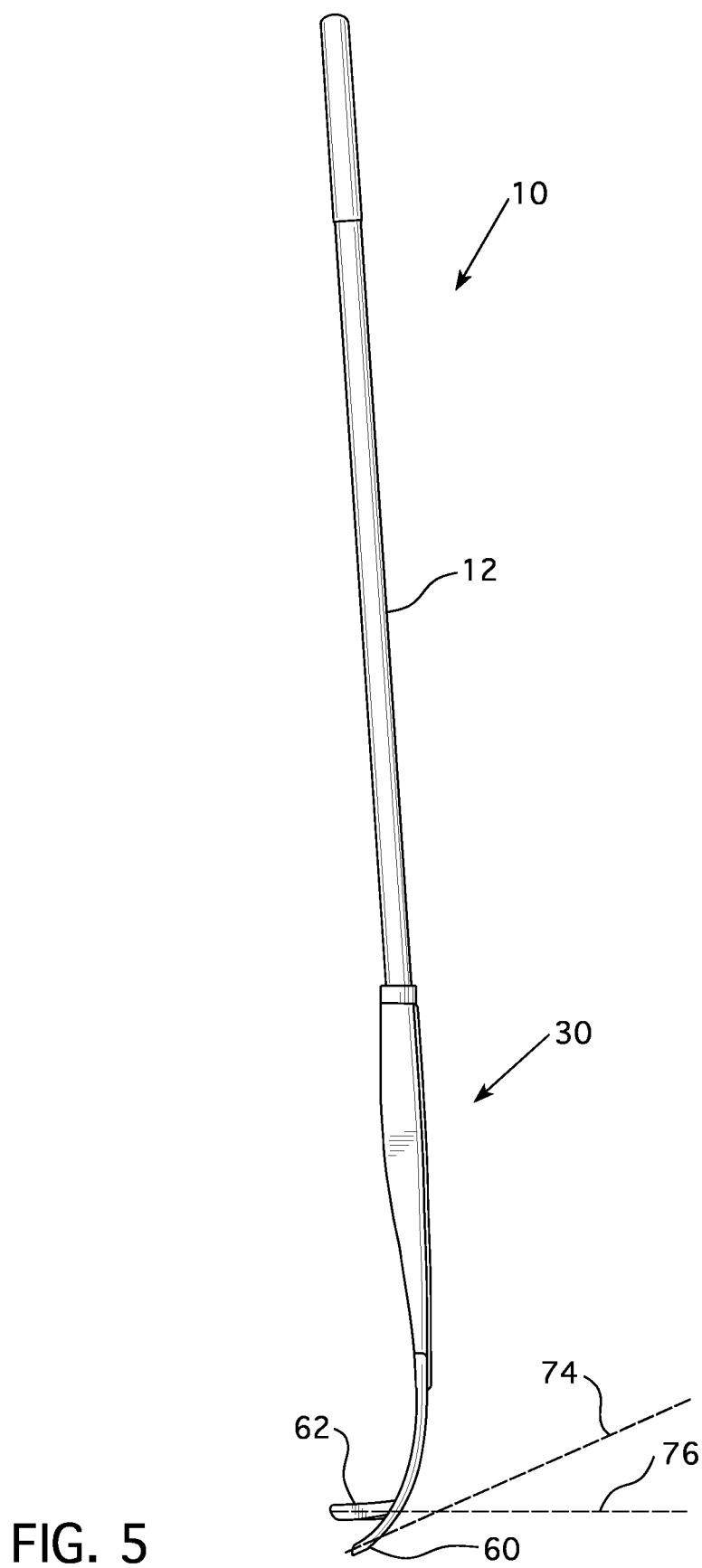
FIG. 5 is a right side view of a rake.
Figure 6:
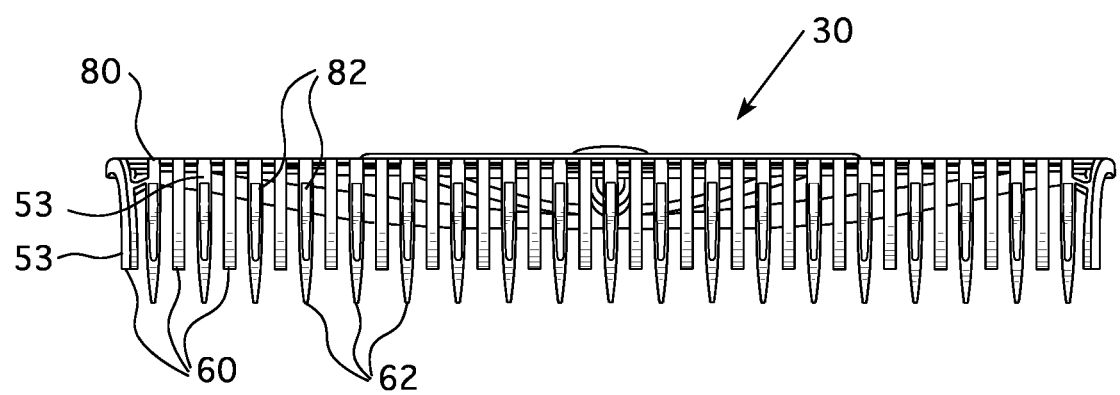
FIG. 6 is a bottom view of a rake.
Figure 7:
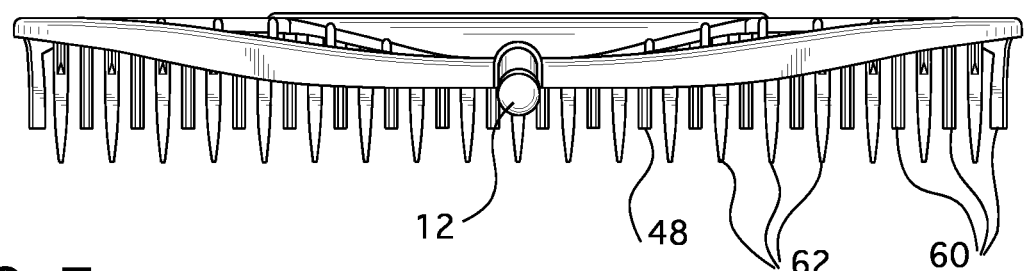
FIG. 7 is a top view of a rake.
Figure 8:
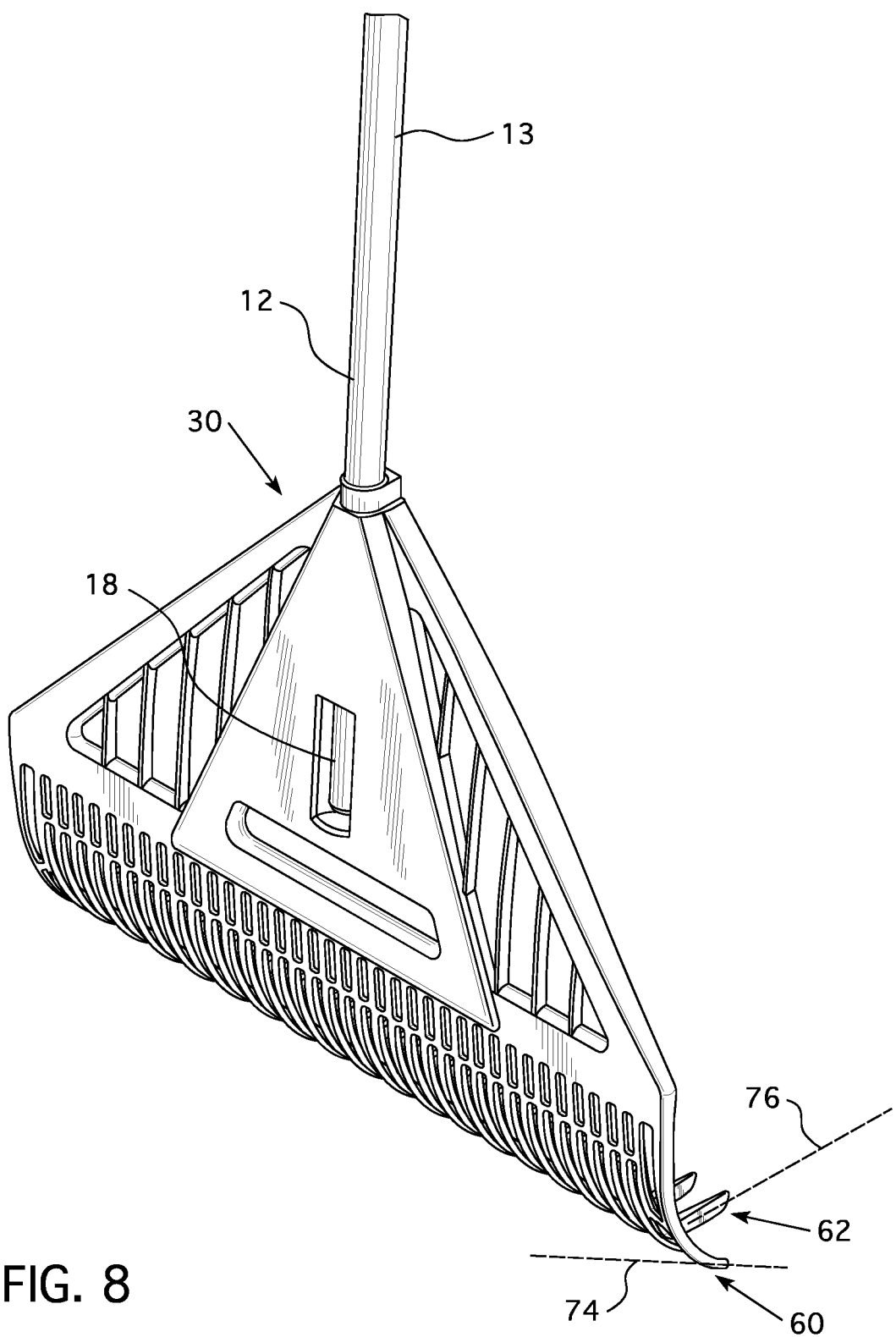
FIG. 8 is a detailed isometric view of a rake.
Figure 9:
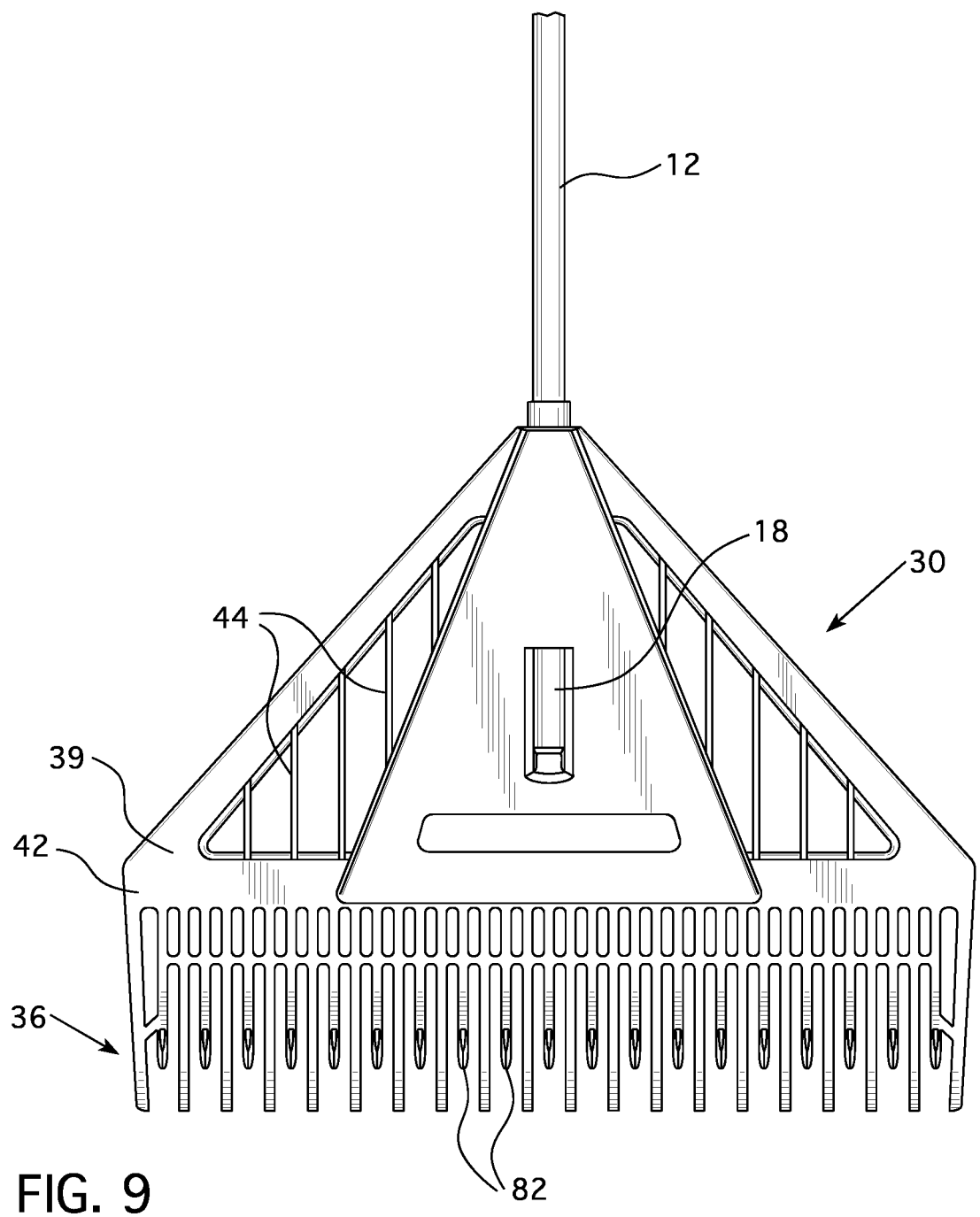
FIG. 9 is a detailed front view of a rake.
Figure 10:
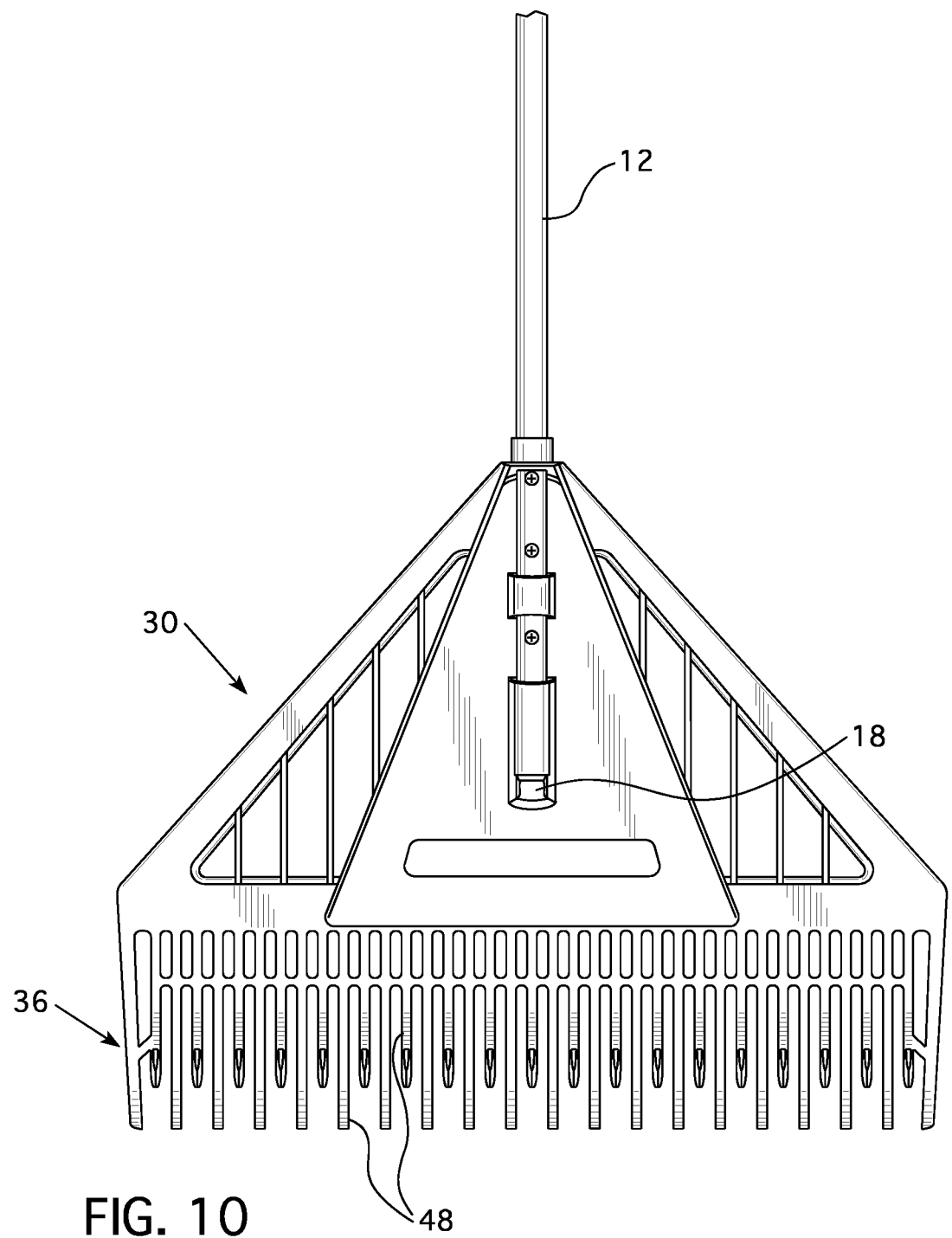
FIG. 10 is a detailed back view of a rake.

The shape and contour of the tines 36 in the first set 60 is, however, different than the shape and contour of the tines 36 in the second set 62. That is, as used herein, the "shape" of a tine 36 means the minimal cross-sectional shape and the "contour" of a tine 36 is the form of the tine 36 when viewed laterally. As shown in FIG. 4, and in an exemplary embodiment, the tines 36, whether in the first set 60 or the second set 62, the tine body first end 50 and medial portion 52 have a similar shape and contour. That is, in both the first and second sets 60, 62, each tine body first end 50 and flexure portion 51 is elongated and disposed substantially in the plane of the base portion 32. In the first set 60, each tine 36 medial portion 52, that is both the flexure portion 51 and offset portion 53, are curvilinear and arc to one side of the base portion 32. In the second set 62, each tine 36 includes distinct bend, or elbow 80 as discussed below, to one side of the base portion 32. Thus, in an exemplary embodiment, all the tips 56 are disposed on the same side of the base portion 32.

Further, a number, a majority, or each tine(s) 36 in the first set 60 have a similar shape, i.e. minimal cross-sectional area, over the length of the tine body 37. In an exemplary embodiment, a number, a majority, or each tine(s) 36 in the first set 60 have a generally rectangular shape. It is noted that any ribs 44 are not included in measuring a tine's shape, i.e. minimal cross-sectional area. In an exemplary embodiment, the lateral cross-sectional aspect ratio for a first set tine body medial portion 52, that is both the flexure portion 51 and offset portion 53, as well as the tine body second end 54 is greater than 1.0. That is, a number, a majority, or each tine(s) 36 in the first set 60 have a greater "width" than "length," as defined above. In another embodiment, not shown, the tines 36 in the first set 60 do not have a similar shape, i.e. minimal cross-sectional shape over the length of the tine body 37. For example, in one exemplary embodiment, not shown, a tine body flexure portion 51 is much wider than the offset portion 53 and supports two tine body offset portions 53. In such embodiments, regardless of the shape of the tine body flexure portion 51, each tine body offset portion 53 has a lateral cross-sectional aspect ratio that is greater than 1.0. In other exemplary embodiments, the lateral cross-sectional aspect ratio for the tines 36 in the first set 60, i.e. the tine body medial portion 52, that is both the flexure portion 51 and offset portion 53, as well as the tine body second end 54 is greater than 1.1, 1.2, 1.5, 2.0, 5.0, 10.0, 15.0, 20.0, 30.0, and/or 50.0. As the lateral cross-sectional aspect ratio contributes to the rigidity of the tine 36, the lateral cross-sectional aspect ratio is a significant feature.

In the first set 60, the tine flexure portions 51 have a length of between about 7.0 inches and 8.0 inches, or about 7.6 inches. As is generally known, the longer an elongated element, the more flexible that element is. Further, in the first set 60, the tine flexure portions 51 have a shape, i.e. a cross-sectional area, of between about 0.35 inch and 0.4 inch, or about 0.375 inch. As the thickness and length of the tine flexure portions 51 contributes to the rigidity of the tine 36, the thickness and length of the tine flexure portions 51 are significant features.

It is noted that the outermost tines 36 have a different shape, but a similar contour, to the first set 60. That is, the outermost tines have a rib 44 disposed along the outermost edge. As such, in the disclosed embodiment, the outermost tines 36 are not a part of the first set nor the second set. The outermost tine do, however, have a lateral cross-sectional aspect ratio for the tine body medial portion 52, that is both the flexure portion 51 and offset portion 53, as well as the tine body second end 54 that is greater than 1.0, 1.1, 1.2, 1.5, 2.0, 5.0, 10.0, 15.0, 20.0, 30.0, and/or 50.0.

As noted above, a number, a majority, or each tine(s) 36 in the second set 62 have a substantially similar shape and contour. The tines 36 in the second set 62, unlike the tines 36 of the first set 60 have a variable cross-sectional shape. That is, in the second set 62, a tine body first end 50 and flexure portion 51, in an exemplary embodiment, have a generally solid rectangular shape wherein the lateral cross-sectional aspect ratio is less than 1.0. Further, in an exemplary embodiment, the tines 36 in the second set 62 include an "elbow 80." That is, the tine bodies 37 in the second set 62 include a relatively sharp bend at the transition between the flexure portion 51 and the offset portion 53. The offset portion 53 also includes a slot or channel 82. That is, the offset portion 53 has a generally U-shaped cross section. In an exemplary embodiment, the channel 82 extends over most of the offset portion 53. In the second set 62, the tine body second ends 54 and distal tips 56, however, are solid.

Further, in an exemplary embodiment, the offset portions 53, the tine body second ends 54 and distal tips 56 are generally trapezoidal. That is, the lateral sides of the offset portions 53, and the tine body second ends 54 are angled, slightly, toward each other front-to-back, as those terms are defined above in reference to the rake base assembly. That is, the offset portions 53 are laterally wider adjacent the elbow 80 and closer together near the tine body second ends 54; that is, in view of the definitions above, front-to-back tapering. Further, a cross-section of the offset portions 53, the tine body second ends 54 and distal tips 56 as described above is, as used herein, a "profile."

Further, the tine body second ends 54 of the tines in the second set 62 have a shape, i.e. a minimal cross-sectional area, that is generally trapezoidal. That is, the bottom side of the tine body second ends 54 is wider than the top side, as those terms are defined above in reference to the rake base assembly; that is, in view of the definitions above, bottom-to-top tapering of the tine body second ends 54.

It is noted that the lateral cross-sectional aspect ratio for a trapezoid is determined by comparing the maximum width to the maximum length. The tines 36 of the second set 62 are "narrow" in that a number, a majority, or each tine(s) 36 in the second set 62 have a lateral cross-sectional aspect ratio for the tine body medial portion 52; that is, both the flexure portion 51 and offset portion 53, as well as the tine body second end 54 that is less than 1.0. In other exemplary embodiments, the lateral cross-sectional aspect ratio for the tines 36 in the second set 62, i.e. the tine body medial portion 52, that is both the flexure portion 51 and offset portion 53, as well as the tine body second end 54 is less than 0.95, 0.9, 0.85, 0.75, 0.66, 0.5, 0.4, and 0.25. As the lateral cross-sectional aspect ratio contributes to the rigidity of the tine 36, the lateral cross-sectional aspect ratio is a significant feature.

In the second set 62, the tine flexure portions 51 have a length of between about 4.75 inches and 5.25 inches, or about 5.0 inches. Further, in the second set 62, the tine flexure portions 51 have a shape, i.e. a cross-sectional area, of between about 0.35 inch and 0.4 inch, or about 0.375 inch. As the thickness and length of the tine flexure portions 51 contributes to the rigidity of the tine 36, the thickness and length of the tine flexure portions 51 are a significant feature.

In this configuration, each tine 36 in the first set 60 has a first flexibility characteristic, and, each tine 36 in the second set 62 has a second flexibility characteristic. The first flexibility characteristic is different from the second flexibility characteristic.

In the first set 60, a number, a majority, or each tine offset portion 53 is also curvilinear while a number, a majority, or each tine second end 54 is an elongated, generally straight portion 72. Thus, a number, a majority, or each first set tine second end 54 has a "longitudinal axis" 74 which extends in a different direction than the handle longitudinal axis. That is, it is specifically stated that a tine second end "longitudinal axis" is different than the handle "longitudinal axis." As used herein, the first set tine second end "longitudinal axis" 74 is used to measure the "angle of a tine" 36 relative to the plane of the head assembly base portion 32. The first set tine second end longitudinal axis 74 of a number, a majority, or each tine second end(s) 54 is at a first angle relative to the plane the base portion 32. Further, the second end 54 of each tine 36 in the second set 62 is generally straight. The tine second end 54 of a number, a majority, or each tine 36 in the second set 62 also has a "longitudinal axis" 76. A second set tine second end longitudinal axis 76 is also used herein for the purpose of measuring the angle of a second set tine body second end 54 relative to the plane of the head assembly base portion. The longitudinal axis 76 of each tine body second end 54 in the second set 62 is at a second angle relative to the plane of said base portion 32. The first angle and the second angle are different.

In an exemplary embodiment, the longitudinal axis 74 of a tine body second end 54 in the first set 60 is at an angle of between about 90 and 130 degrees, or, in an exemplary embodiment, about 115 degrees, relative to the plane said base portion 32. The longitudinal axis 76 of a tine body second end 54 in the second set 62 is at an angle of between about 90 and 130 degrees, or in an exemplary embodiment about 90 degrees, relative to the plane of the base portion 32. In this configuration, the tips 56 of the tines 36 in the first set 60 are spaced from the tips 56 of the tines 36 in the second set 62. Further, in an exemplary embodiment, the tips 56 of the tines 36 in the second set 62 have a greater offset, i.e. are spaced further from, the plane said base portion 32 than the tips 56 of the tines 36 in the first set 60.

In an exemplary embodiment, not shown, the handle coupling 34 includes an adjustment assembly. The adjustment assembly is structured to allow the handle 12 to move longitudinally relative to the base portion 32. In an exemplary embodiment, the adjustment assembly includes an elongated socket and a locking assembly. The socket corresponds to the shape of the handle 12. In an exemplary embodiment, the handle 12 has a generally circular cross-sectional shape and the socket is a generally cylindrical cavity. The socket includes a number of perpendicular (radial) openings. The handle second end 18 includes a number of perpendicular (radial) extensions. The locking assembly is structured to move the handle second end 18 between a first position, wherein the perpendicular extensions are disposed in the perpendicular openings, and a second position, wherein the perpendicular extensions are not disposed in the perpendicular openings. When the handle second end 18 is in the first position, contact between the perpendicular extensions and the edges of the perpendicular openings prevents longitudinal movement of the handle 12. When the handle second end 18 is in the second position, the perpendicular extensions do not contact the socket and the handle 12 may be moved longitudinally relative to the base portion 32. In an exemplary embodiment, the handle 12 moves longitudinally between about three and ten inches, or about six inches, relative to the base portion 32.

In an exemplary embodiment, not shown, the locking assembly includes a biasing device and a release device. The biasing device is structured to bias the handle second end 18 toward the handle second end first position. The release device is structured to overcome the bias of the biasing device and to move the handle second end 18 to the handle second end second position.

In an exemplary embodiment, shown, the handle coupling 32 includes a radial collar disposed at the base assembly apex 40 and a longitudinal socket disposed adjacent the base portion lateral slot 46. The handle 12 extends through the collar and handle second end 18 is disposed in the socket.

Figure 11:
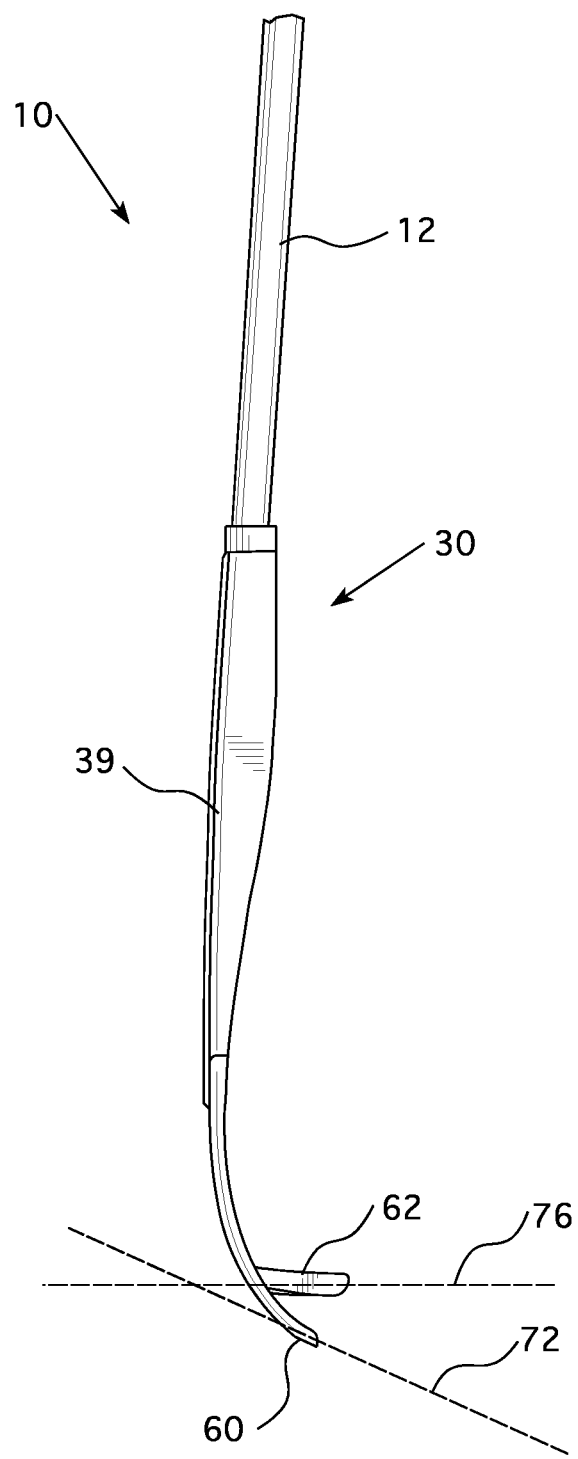
FIG. 11 is a detailed left side view of a rake.
Figure 12:
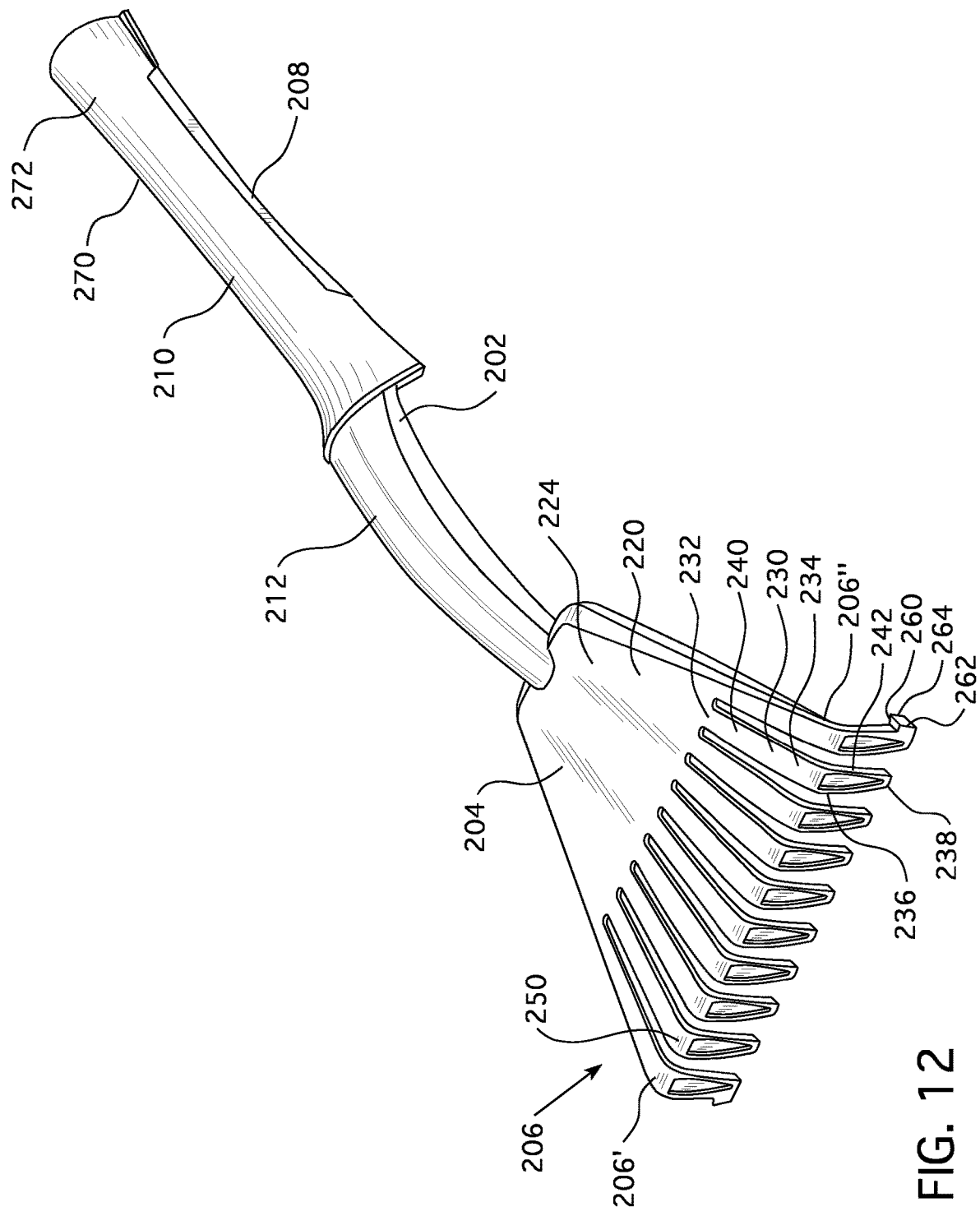
FIG. 12 is a first isometric view of a shrub rake.
Figure 13:
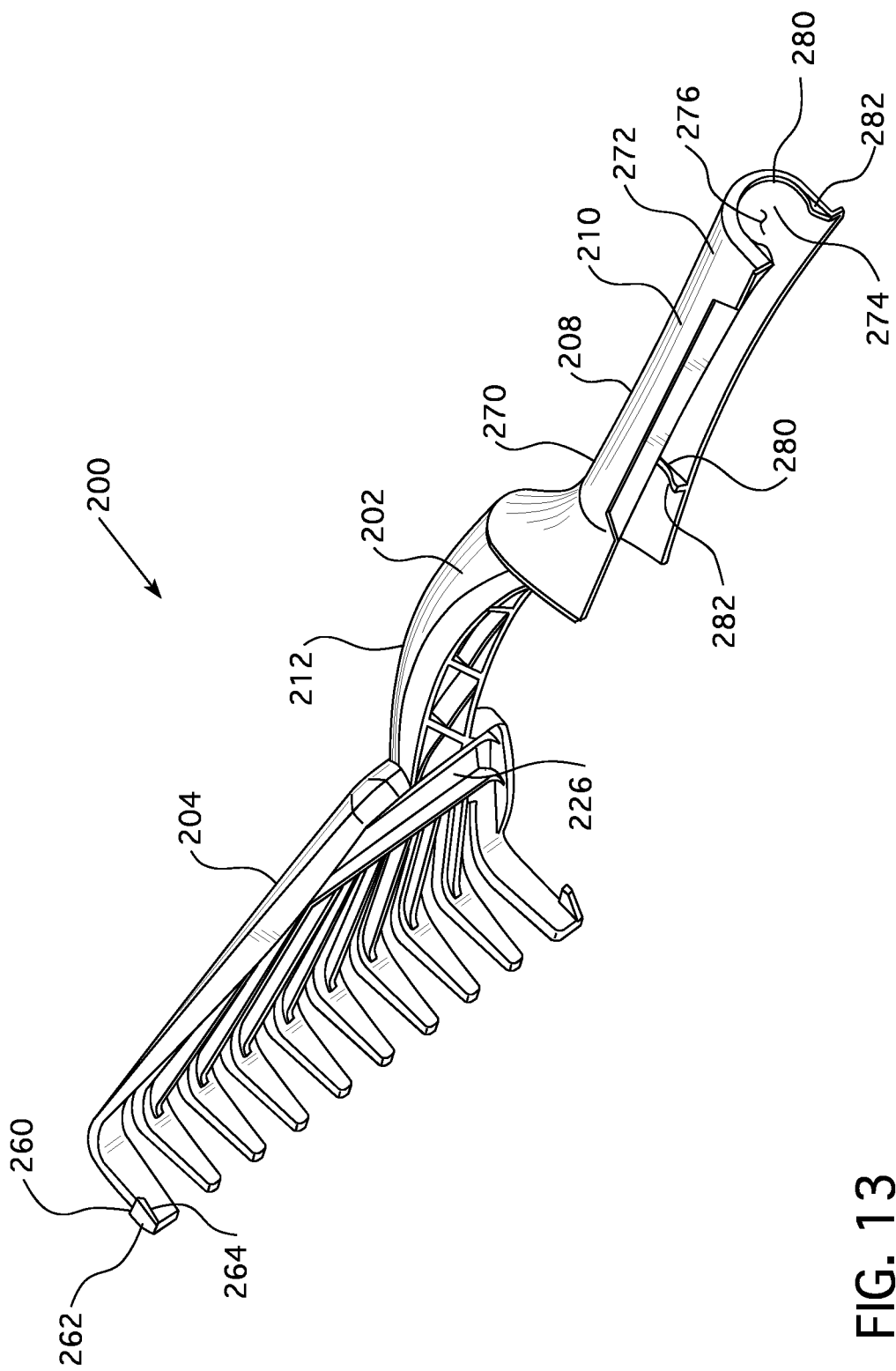
FIG. 13 is a second isometric view of a shrub rake.

In an exemplary embodiment, shown in FIGS. 11-13, the rake 10 further includes a selectively coupled shrub rake 200. That is, the rake 10 includes a shrub rake coupling 190 (FIG. 1) structured to couple the shrub rake 200 to the rake 10. The shrub rake 200 includes a body 202 having a base portion 204, a number of tines 206, a coupling 208 and a handle 210. The shrub rake body 202, in an exemplary embodiment, further includes an elongated support member 212. The elongated support member 212 is coupled to, and disposed between, the shrub rake base portion 204 and the rake coupling 208. In an exemplary embodiment, the shrub rake base portion 204, number of tines 206, rake coupling 208, handle 210 and elongated support member 212 are a unitary shrub rake body 202.

The shrub rake body 202, in an exemplary embodiment, is made from an injection polymer such as, but not limited to, high density polyethylene or propylene. The base portion 204 is a generally planar body 220 having a generally trapezoidal shape including a minor top side 224 and a major bottom side 226, both of which extend generally laterally. That is, both the base portion body top side 224 and bottom side 226 are elongated and extend laterally, but the bottom side 226 is longer than the top side 224.

Each shrub rake tine 206 is an elongated body 230 and includes a proximal, first end 232, a medial portion 234 and a distal, second end 236. Each tine body medial portion 234 includes a flexure portion 240 and an offset portion 242. Each tine body second end 236 includes a tip 238. In an exemplary embodiment, each shrub rake tine medial portion 234 includes a shape bend, or elbow 250. Each shrub rake tine elbow 250 is disposed at the transition between shrub rake tine flexure portion 240 and offset portion 242. In an exemplary embodiment, the number of shrub rake tines 206, collectively, have a maximum width of between about 7.5 inches and 8.0 inches, or about 7.7 inches. This width is smaller than the rake 10 and allows the shrub rake 200 to be used in locations that are too small for the rake 10. As such the collective width of the shrub rake tines 206 is a significant feature.

Further, as shown in FIG. 13, the shrub rake outermost tines 206', 206" include a latching surface 260 (hereinafter "shrub rake latching surface"). In an exemplary embodiment, each shrub rake latching surface 260 is disposed on a tab 262 that extends laterally and upwardly (that is toward the top of the shrub rake 200) from each shrub rake outermost tines 206', 206". Each tab 262 includes the shrub rake latching surface 260 as well as a shrub rake displacing surface 264. When the shrub rake 200 is coupled to the rake 10, as described below, the shrub rake latching surface 260 extends generally parallel to the plane of the base portion body 39. The shrub rake displacing surface 264 is disposed at an acute angle relative to the lateral slot latching surface 47 which it engages, as described below.

The shrub rake support member 212, in an exemplary embodiment, extends from the base portion body top side 224. The shrub rake support member 212 is elongated and extends in a direction generally perpendicular to the base portion body top side 224. That is, the longitudinal axis of the shrub rake support member 212 extends in a direction generally perpendicular to the base portion body top side 224. In an exemplary embodiment, and as shown, the shrub rake support member 212 is curvilinear when viewed from a lateral side.

In an exemplary embodiment, the shrub rake body coupling 208 and shrub rake body handle 210 are generally coextensive. That is, the shrub rake body handle 210 defines the shrub rake body coupling 208, or, stated alternatively, the shrub rake body coupling 208 is structured as a handle 210. In the embodiment shown, the shrub rake body handle 210 is an elongated member 270 having a generally U-shaped cross-section. Thus, the shrub rake body handle 210, or stated alternatively the shrub rake body coupling 208, defines a U-shaped channel 276.

Further, the elongated member 270 includes an outer surface 272 and an inner surface 274. The elongated member outer surface 272 is structured as the shrub rake body handle 210. That is, the elongated member 270 is sized and shaped so that a typical adult human hand can grasp a portion of the elongated member outer surface 272 in the manner of a handle. The elongated member inner surface 274 is structured as the shrub rake body coupling 208.

In an exemplary embodiment, the U-shaped channel 276 is a coupling structured to couple the shrub rake body 202 to the rake 10. In an exemplary embodiment, the shape of the U-shaped channel 276 bight generally corresponds to the shape of the handle medial portion 16. For example, and as shown, the handle medial portion 16 is generally circular. Similarly, the U-shaped channel 276 bight is generally circular. As the shrub rake body 202 is, in an exemplary embodiment, made from an injection polymer, the shrub rake body 202 is slightly flexible, as is known.

In one exemplary embodiment, not shown, the curvature of the U-shaped channel 276 bight extends slightly over 180 degrees. In this configuration, the U-shaped channel 276 is structured to partially encircle the handle medial portion 16. That is, a user couples the shrub rake body 202 by disposing the handle medial portion 16 in the U-shaped channel 276. As the handle medial portion 16 moves into the U-shaped channel 276, the U-shaped channel 276 tines separate so as to allow the handle medial portion 16 to pass therethrough. Thus, the shrub rake body coupling 208 is a snap-fit coupling.

In an exemplary embodiment, shown in FIG. 13, the U-shaped channel 276 tines are generally parallel. The inner surface of the U-shaped channel 276, i.e. elongated member inner surface 274, however, includes number of planar protrusions 280. The protrusions 280 are disposed at the tips of the tine of U-shaped channel 276. The protrusions 280 have an inner surface 282 that corresponds to, i.e. has a similar curvature as, the inner surface of the U-shaped channel 276 bight. Further, the protrusions 280 extend in a plane generally perpendicular to the longitudinal axis of the U-shaped channel 276.

Figure 14:
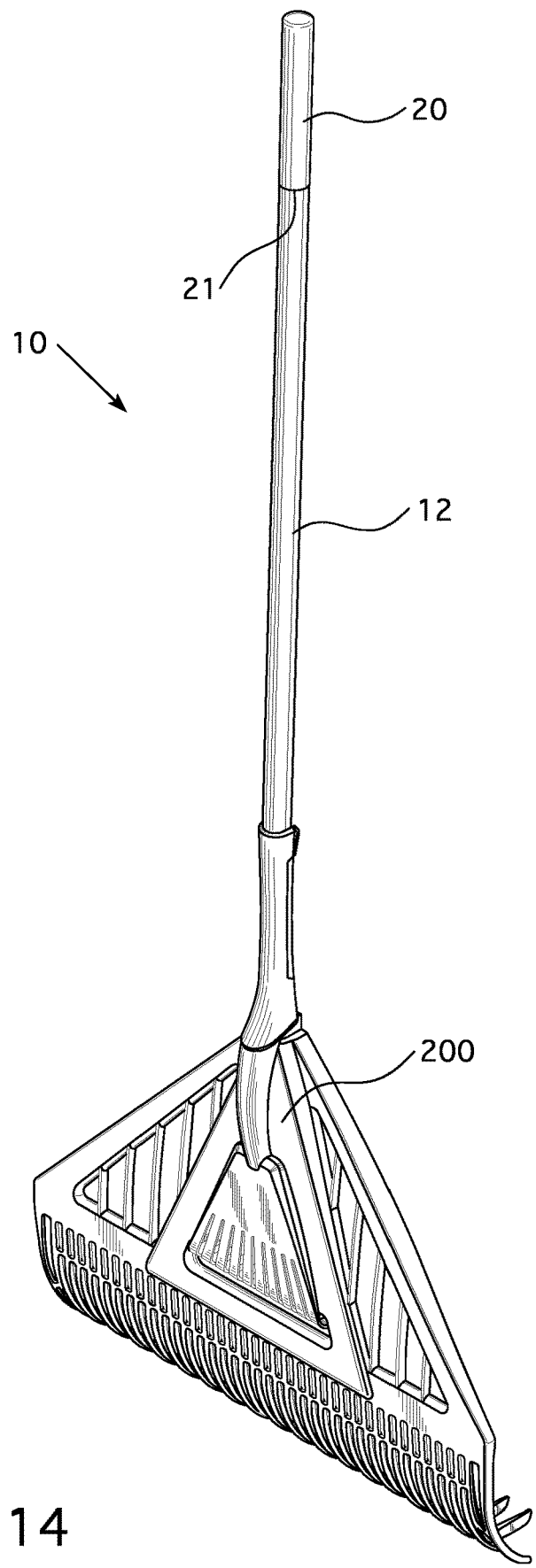
FIG. 14 is an isometric view of a shrub rake coupled to a rake.

As shown in FIG. 14, in an exemplary embodiment, the longitudinal length of the shrub rake support member 212, the shrub rake base portion 204 and the shrub rake tines 206 have a combined length generally corresponding to the length between the head assembly base portion body top side 224 and the head assembly base portion body slot 46. In this configuration, the shrub rake 200, when coupled to the rake 10 is generally disposed over the rake head assembly base portion 32.

The shrub rake 200 is coupled to the rake 10 as follows. The shrub rake body 202 is positioned over the front side of the head assembly 30 with the shrub rake tines 206 generally aligned with the base portion lateral slot 46 and the U-shaped channel 276 generally aligned with the handle medial portion 16. The user begins to move the handle medial portion 16 into the U-shaped channel 276, the handle medial portion 16 engages the number of planar protrusions 280 causing the U-shaped channel 276 tine to flex outwardly. As the user fully moves the handle medial portion 16 into the U-shaped channel 276, the widest cross-sectional area of the handle medial portion 16 moves past the number of planar protrusions 280 and the U-shaped channel 276 returns to its original shape. In this configuration, the handle medial portion 16 is disposed within the U-shaped channel 276 and held therein by protrusions 280.

Generally at the same time, the shrub rake tines 206 move into the base portion lateral slot 46. As the shrub rake tines 206 move into the base portion lateral slot 46, the shrub rake displacing surface 264, which is located on the shrub rake outermost tines 206', 206", engage the lateral slot displacement surface 45. This engagement causes the shrub rake outermost tines 206', 206" to flex, thereby allowing the shrub rake latching surfaces 260 to pass over the lateral slot displacement surface 45 and lateral slot latching surface 47. As the shrub rake tines 206 pass through the base portion lateral slot 46, the shrub rake displacing surface 264 passes over the edge of the lateral slot latching surface 47 thereby allowing the shrub rake outermost tines 206', 206" to return to an un-flexed configuration. That is, the shrub rake latching surface 260 is disposed over, i.e. face-to-face with, the lateral slot latching surface 47. In this configuration, the shrub rake tines 206 are selectively, i.e. temporarily, latched to the head assembly 30. Thus, in this configuration, the shrub rake 200 is selectably, i.e. temporarily, coupled to the rake 10.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A leaf rake, comprising:
a handle including an elongated body with an upper, first end, a medial portion, and a lower, second end;
a head assembly including a base portion and a handle coupling, the handle coupled to the head assembly by the handle coupling, the head assembly including a first set of tines and a second set of tines both unitary with the base portion, wherein each tine of the first set of tines and the second set of tines includes an elongated body having a first end, an offset portion, and a distal second end, wherein the offset portion of the first set of tines is disposed on a first side of the base portion and wherein the offset portion of the second set of tines is disposed on the first side of the base portion; and
a shrub rake including a coupling, a base portion and a number of tines, the shrub rake selectively coupled to the head assembly,
wherein the head assembly base portion is generally planar and each tine second end includes a longitudinal axis, wherein a number of tine second end longitudinal axes in the first set of tines are at a first angle relative to a plane of the base portion and a number of tine second end longitudinal axes in the second set of tines are at a second angle relative to the plane of the base portion, wherein the first angle and the second angle are different, wherein the head assembly base portion includes a slot arranged to receive the shrub rake tines.

2. The leaf rake of claim 1, wherein the shrub rake coupling defines an elongated channel sized to receive the handle medial portion.

3. The leaf rake of claim 2, wherein an inner surface of the channel includes a number of protrusions.

4. The leaf rake of claim 1, wherein the slot includes a displacement surface that extends about and defines the slot.

5. The leaf rake of claim 1, wherein a back side of the head assembly base portion includes a latching surface adjacent the slot.

6. The leaf rake of claim 5, wherein each shrub rake tine includes a first end, a medial portion, and a second end, wherein a number of the shrub rake tine second ends include a latching surface.

7. The leaf rake of claim 6, where each shrub rake latching surface is arranged to engage the base portion latching surface to selectively couple the shrub rake to the head assembly.

8. The leaf rake of claim 6, wherein the shrub rake latching surface is disposed on a tab on each outermost shrub rake tine.

9. The leaf rake of claim 1, wherein each tine of the first set of tines and the second set of tines includes a support rib on a back side thereof.

10. The leaf rake of claim 1, wherein the head assembly includes outermost tines having a similar contour to the first set of tines, wherein the outermost tines have a rib disposed along an outermost edge thereof.

11. The leaf rake of claim 1, wherein the shrub rake includes an elongated support member disposed between the shrub rake coupling and the shrub rake base portion, wherein the support member is curvilinear when viewed from a lateral side.

12. The leaf rake of claim 1, wherein the head assembly base portion includes a number of ribs, the head assembly base portion defining an opening through which the ribs extend.

13. The leaf rake of claim 1, wherein the head assembly base portion includes a number of longitudinal openings, wherein each longitudinal opening is aligned with a gap between adjacent tines.

* * * * *